United States Patent
Park et al.

(10) Patent No.: US 8,620,509 B2
(45) Date of Patent: Dec. 31, 2013

(54) CONTROL METHOD FOR POWERTRAIN OF HYBRID VEHICLE IN COMPOUND SPLIT MODE

(75) Inventors: Joon Young Park, Seoul (KR); Sang Joon Kim, Seoul (KR); Sung Deok Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 2 days.

(21) Appl. No.: 13/526,927

(22) Filed: Jun. 19, 2012

(65) Prior Publication Data

US 2013/0030625 A1 Jan. 31, 2013

(30) Foreign Application Priority Data

Jul. 25, 2011 (KR) .......................... 10-2011-0073805

(51) Int. Cl.
*F16H 59/70* (2006.01)
(52) U.S. Cl.
USPC .................................. 701/22; 475/5; 903/945
(58) Field of Classification Search
USPC .................................. 701/22; 903/945; 475/5
See application file for complete search history.

(56) References Cited

U.S. PATENT DOCUMENTS

2010/0137091 A1* 6/2010 Park et al. .......................... 475/5

FOREIGN PATENT DOCUMENTS

| JP | 2004248410 A | 9/2004 |
|---|---|---|
| JP | 2009154622 A | 7/2009 |
| JP | 2009173272 A | 8/2009 |
| JP | 2010137723 A | 6/2010 |
| KR | 10-0986564 | 10/2010 |
| KR | 1020110049402 A | 5/2011 |

OTHER PUBLICATIONS

Choi, Woulsun et al.; A Study on Mode Change Control Algorithm for Dual Mode HEV; School of Mechanical Engineering, Sungkyunkwan University, 300 Cheoncheon-dong, Suwon, 440-746, Korea; pp. 2124-2129.

* cited by examiner

*Primary Examiner* — Mary Cheung
*Assistant Examiner* — Yuen Wong
(74) *Attorney, Agent, or Firm* — Edwards Wildman Palmer LLP; Peter F. Corless (57) ABSTRACT

A control method for a powertrain of a hybrid vehicle executing a compound split mode where a first carrier and a second ring gear are selectively connected. More specifically, a controller, determines a target torque of the second motor/generator based on a gear ratio of the first sun gear and the first ring gear, a gear ratio of the second sun gear and the second ring gear, a demand torque of the powertrain, and an output torque of the first motor/generator; determines a compensation value based on a target speed of the engine and a current speed of the engine; and determines a final torque of the second motor/generator based on the target torque of the second motor/generator and the compensation value, and controlling the second motor/generator according to the final torque of the second motor/generator.

17 Claims, 7 Drawing Sheets

CONTROL METHOD FOR POWERTRAIN OF HYBRID VEHICLE IN COMPOUND SPLIT MODE

CROSS-REFERENCE TO RELATED APPLICATION

This application claims priority to and the benefit of Korean Patent Application No. 10-2011-0073805 filed in the Korean Intellectual Property Office on Jul. 25, 2011, the entire contents of which are incorporated herein by reference.

BACKGROUND OF THE INVENTION (a) Field of the Invention

The present invention relates to a control method for a powertrain system of a hybrid vehicle. More particularly, the present invention relates to a control method for a powertrain of a hybrid vehicle in a compound split mode.

(b) Description of the Related Art

Hybrid vehicles have become increasingly popular over the last couple of years due to their high fuel efficiency and low impact on the environment. A hybrid vehicle is a vehicle that uses two or more distinct power sources to move the vehicle. The term most commonly refers to hybrid electric vehicles (HEVs), which combine an internal combustion engine and one or more electric motors powered by a battery. However, alternative forms of hybrid vehicles do exist, Hybrid Fuel cell vehicles.

A hybrid vehicle may operate in various control modes based on the vehicle's driving conditions. For example, a hybrid vehicle operate in FG (fixed gear) modes and EVT (electrical variable transmission) modes of which speed and torque are controlled using a plurality of planetary gear sets, an engine, and a motor/generator.

While operating in EVT modes, in a compound split mode (e.g., EVT2), a first motor/generator MG1 is used for controlling a driving point of an engine (i.e., speed control of the engine), and a second motor/generator MG2 is used for controlling engine torque and compensating for demand torque.

During the compound split mode (EVT2 mode), when the driving point of the engine increases, the MG1 executes speed control to follow the engine driving point. However, efficiency of following the engine driving point and demand torque output may vary based on a control method of the MG2.

Conventionally, the control method of MG2 is used for compensating for engine torque. When the current speed of the engine does not follow a target driving point, the MG1 outputs a maximum output for following the target driving point. Simultaneously, the MG2 maintains a maximum output for satisfying demand torque when the engine speed does not increase sufficiently. In this case, since compensating torque of the MG2 increases, the efficiency of following the engine driving point and SOC (state of charge) balancing may be further deteriorated.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a control method for a powertrain of a hybrid vehicle in a compound split mode having advantages that a second motor/generator may be controlled with a compensation value for an engine to be operated under an optimal condition when a current speed of the engine does not follow a target driving point.

A control method for a powertrain of a hybrid vehicle according to an exemplary embodiment of the present invention may include: a first planetary gear set including a first sun gear, a first carrier, and a first ring gear; a second planetary gear set including a second sun gear connected with the first sun gear, a second carrier, and a second ring gear; an engine connected with the first carrier; a first motor/generator connected with the first ring gear; and a second motor/generator connected with the second sun gear.

The control method in the compound split mode where the first carrier and the second ring gear are selectively connected includes: determining, by a controller, a target torque of the second motor/generator based on a gear ratio of the first sun gear and the first ring gear, a gear ratio of the second sun gear and the second ring gear, a demand torque of the powertrain, and an output torque of the first motor/generator; determining, by the controller, a compensation value based on a target speed of the engine and a current speed of the engine; and determining, by the controller, a final torque of the second motor/generator based on the target torque of the second motor/generator and the compensation value, and controlling, by the controller the second motor/generator based on the final torque of the second motor/generator.

The target torque of the second motor/generator may be determined by a relationship of $T_{MG2}=1/(1+R_2) \cdot T_{OUT}+1/R_1 \cdot T_{MG1}$, wherein $R_1$ is the gear ratio of the first sun gear and the first ring gear, $R_2$ is the gear ratio of the second sun gear and the second ring gear, $T_{OUT}$ is the demand torque of the powertrain, and $T_{MG1}$ is the output torque of the first motor/generator.

The compensation value may be a reduced torque of the second motor/generator, wherein the reduced torque of the second motor/generator is determined based on a target speed of the engine, a difference between the target speed of the engine and the current speed of the engine, and the demand torque based on a driving condition.

In some exemplary embodiments of the present invention, the final torque of the second motor/generator may be a sum of the compensation value and the target torque of the second motor/generator. The compensation value may be the reduced torque which has passed through a low pass filter for preventing the compensation value from fluctuating.

The final torque of the second motor/generator may be "0" when a torque direction of the final torque of the second motor/generator is the same as that of the output torque of the first motor/generator. Additionally, the final torque of the second motor/generator may be determined as a predetermined minimum torque when the final torque of the second motor/generator is less than the predetermined minimum torque which is determined for stability of the system of the powertrain.

The final torque of the second motor/generator may be determined as a predetermined maximum torque when the final torque of the second motor/generator is higher than the predetermined maximum torque which is determined for stability of the system of the powertrain.

A control method for a powertrain of a hybrid vehicle in a compound split mode according to an exemplary embodiment of the present invention may include: determining, by a controller, whether a current driving mode is a compound split mode; determining a target speed of an engine; determining whether a difference of target speed of the engine and a current engine speed is within a predetermined error range;

calculating an output torque of a first motor/generator and controlling the first motor/generator according to the calculated output torque of the first motor/generator; and calculating a final torque of a second motor/generator based on a target torque of the second motor/generator, which is calculated based on a gear ratio of a first sun gear and a first ring gear, a gear ratio of a second sun gear and a second ring gear, a demand torque of the powertrain and the output torque of the first motor/generator, and a compensation value which is determined based on a target speed of the engine, a current speed of the engine, and the demand torque based on driving conditions, and controlling the second motor/generator according to the calculated final torque of the second motor/generator.

The target torque of the second motor/generator may be determined by a relationship of $T_{MG2}=1/(1+R_2) \cdot T_{OUT}+1/R_1 \cdot T_{MG1}$, wherein $R_1$ is the gear ratio of the first sun gear and the first ring gear, $R_2$ is the gear ratio of the second sun gear and the second ring gear, $T_{OUT}$ is the demand torque of the powertrain, and $T_{MG1}$ is the output torque of the first motor/generator.

The compensation value may be a reduced torque of the second motor/generator, wherein the reduced torque of the second motor/generator is determined based on the target speed of the engine, a difference between the target speed of the engine and the current speed of the engine, and the demand torque based on a driving condition.

The final torque of the second motor/generator may be a sum of the compensation value and the target torque of the second motor/generator. The compensation value may be the reduced torque which has passed through a low pass filter for preventing the compensation value from fluctuating. The final torque of the second motor/generator may be "0" when a torque direction of the final torque of the second motor/generator is the same as that of the output torque of the first motor/generator.

The final torque of the second motor/generator may be determined as a predetermined minimum torque when the final torque of the second motor/generator is less than the predetermined minimum torque which is determined for stability of the system of the powertrain.

The final torque of the second motor/generator may be determined as a predetermined maximum torque if the final torque of the second motor/generator is higher than the predetermined maximum torque which is determined for stability of the system of the powertrain.

The control method for a powertrain of a hybrid vehicle in a compound split mode according to an exemplary embodiment of the present invention may enhance efficiency of following an engine driving point.

BRIEF DESCRIPTION OF THE DRAWINGS

It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DESCRIPTION OF SYMBOLS

S1: first sun gear
S2: second sun gear
C1: first carrier
C2: second carrier
RG1: first ring gear
RG2: second ring gear
CL1: first clutch
CL2: second clutch
BK1: first brake
BK2: second brake
PG1: first planetary gear set
PG2: second planetary gear set
MG1: first motor/generator
MG2: second motor/generator
E: engine
B: battery It should be understood that the appended drawings are not necessarily to scale, presenting a somewhat simplified representation of various preferred features illustrative of the basic principles of the invention.

In the figures, reference numbers refer to the same or equivalent parts of the present invention throughout the several figures of the drawing.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In overall specification, in addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function or operation, and can be implemented by hardware components or software components and combinations thereof.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

An exemplary embodiment of the present invention will hereinafter be described in detail with reference to the accompanying drawings.

Figure 7:
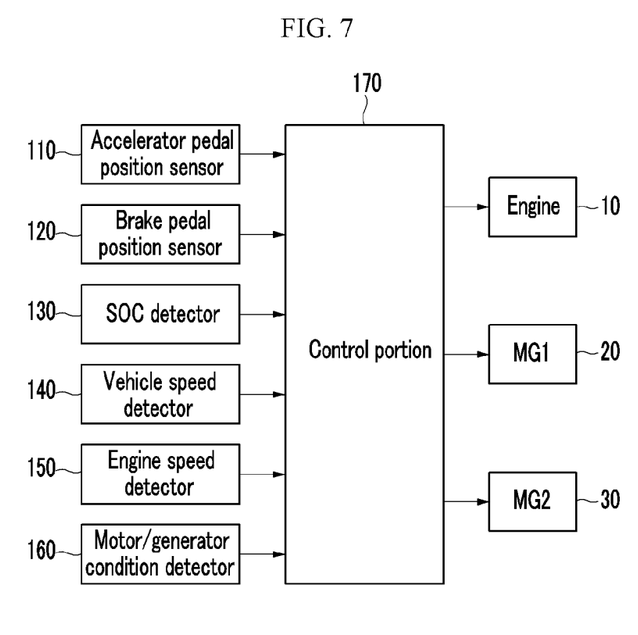
FIG. 7 is a block diagram of a control method for a powertrain of a hybrid vehicle according to an exemplary embodiment of the present invention.

FIG. 7 is a block diagram of a control method for a powertrain of a hybrid vehicle according to an exemplary embodiment of the present invention.

A hybrid vehicle to which a control method and system for a powertrain of a hybrid vehicle according to an exemplary embodiment of the present invention may be applied includes at least one engine 10 and first and second motor/generators 20 and 30. The hybrid vehicle may be operated in a hybrid mode in which the engine 10 and the first and second motor/generators 20 and 30 are simultaneously operated.

As shown in FIG. 7, a control system to which a control method for a powertrain of a hybrid vehicle according to an exemplary embodiment of the present invention may be applied includes an accelerator pedal position sensor 110, a brake pedal position sensor 120, an SOC (state of charge) detector 130, a vehicle speed detector 140, an engine speed detector 150, a motor/generator condition detector 160, and a control portion 170.

The accelerator pedal position detector 110 detects a position of an accelerator pedal (depressed degree of the accelerator pedal) and delivers a signal corresponding thereto to the control portion 170. When the accelerator pedal is completely decompressed the position of the accelerator pedal is at 100%, and when the accelerator pedal is not pushed the position of the accelerator pedal is 0%. A throttle valve opening sensor installed at an intake passage may be used instead of the accelerator pedal position detector 110. Therefore, it is to be understood that the accelerator pedal position detector 110 includes the throttle valve opening sensor, and the position of the accelerator pedal includes an opening of a throttle valve.

The brake pedal position detector 120 detects a position of a brake pedal (depressed degree of the brake pedal) and delivers a signal corresponding thereto to the control portion 170. When the brake pedal is completely depressed the position of the brake pedal is at 100%, and when the brake pedal is not depressed the position of the brake pedal is at 0%.

The SOC detector 130 detects the SOC of a battery and delivers a signal corresponding thereto to the control portion/controller 170. Instead of directly detecting the SOC of a battery, current and voltage of the battery may be detected and the SOC of the battery may be estimated based thereon.

The vehicle speed detector 140 is installed in the vicinity of a wheel of the vehicle, detects the vehicle speed, and delivers a signal corresponding thereto to the control portion 170.

The engine speed detector 150 is installed at an output portion of the engine 10, detects an engine speed, and delivers a signal corresponding thereto to the control portion 170.

The motor/generator condition detector 160 detects a speed, a torque, and so on of the first and second motor/generators 20 and 30, and delivers a signal corresponding thereto to the control portion 170. A maximum torque that can be output by the engine 10, a maximum torque that can be output by the first and second motor/generators 20 and 30, and creep torque (sum of an engine torque and motor torque of the first and second motor/generators 20 and 30) enabling creep driving of the vehicle are stored in the control portion 170 as well.

The control portion 170 calculates an acceleration torque based on the position of the accelerator pedal, the minimum torque, and the maximum torque of the vehicle, and calculates an engine division torque and a motor division torque which the engine 10 and the first and second motor/generators 20 and 30 should respectively output.

Figure 1:
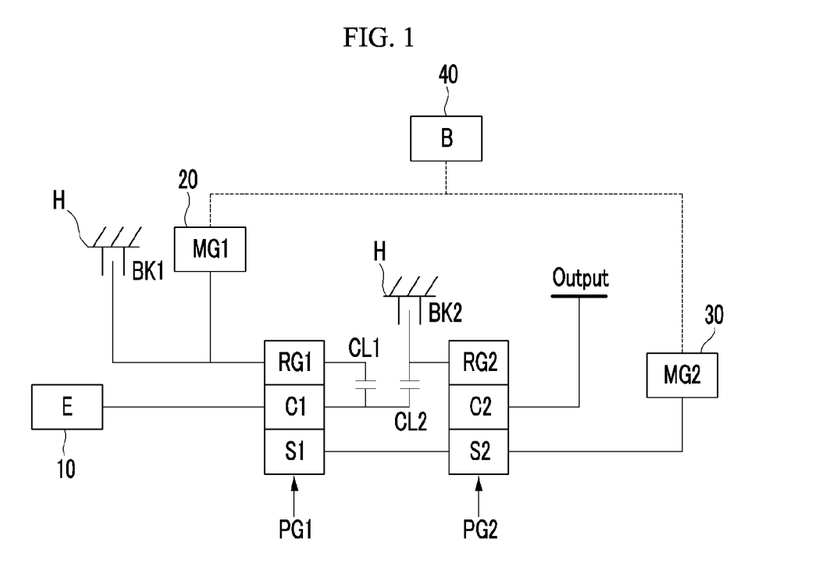
FIG. 1 is a schematic diagram of a powertrain of a hybrid vehicle which may be applied to a control method in compound split mode according to an exemplary embodiment of the present invention.

FIG. 1 is a schematic diagram of a powertrain of a hybrid vehicle which may be applied to a control method in a compound split mode according to an exemplary embodiment of the present invention. Referring to FIG. 1, a powertrain of a hybrid vehicle to which a control method according to an exemplary embodiment of the present invention may be applied includes a first planetary gear set PG1 including a first sun gear S1, a first carrier C1 and a first ring gear RG1, a second planetary gear set PG2 including a second sun gear S2 connected with the first sun gear S1, a second carrier C2 and a second ring gear RG2, the engine 10 connected with the first carrier C1, the first motor/generator (MG1) 20 connected with the first ring gear RG1, and the second motor/generator (MG2) 30 connected with the second sun gear S2.

A battery 40 is connected to the first motor/generator MG1 and the second motor/generator MG2, and supplies and stores electrical power to/from the first motor/generator MG1 and the second motor/generator MG2.

A first clutch CL1 is interposed between the first carrier C1 and the first ring gear RG1, a second clutch CL2 is interposed between the first carrier C1 and the second ring gear RG2, a first brake BK1 is interposed between the first ring gear RG1 and a transmission housing H, and a second brake BK2 is interposed between the second ring gear RG2 and the transmission housing H.

The powertrain as shown in FIG. 1 may execute an EVT1 mode in which the second brake BK1 is engaged, an EVT2 mode in which the second clutch CL2 is engaged, an FG1 mode in which the second brake BK2 and the first clutch CL1 are engaged, an FG2 mode in which the first clutch CL1 and the second clutch CL2 are engaged, and an FG3 mode in which the second clutch CL2 and the first brake BK1 are engaged.

As stated above, in a compound split mode (EVT2), the first motor/generator MG1 is used for controlling the driving point of an engine (speed control) and the second motor/generator MG2 is used for controlling engine torque and compensating demand torque.

Figure 2:
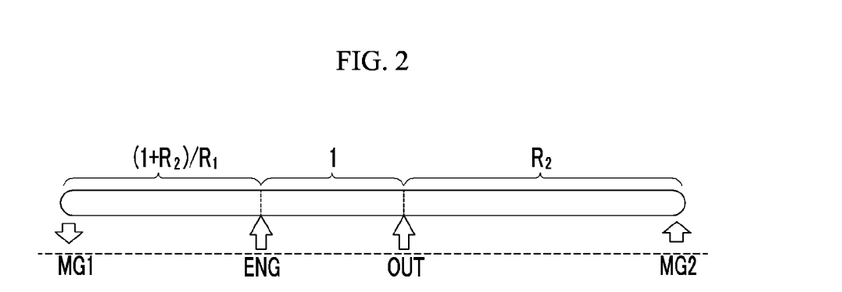
FIG. 2 is a lever diagram of a powertrain of a hybrid vehicle according to an exemplary embodiment of the present invention.

FIG. 2 is a lever diagram of a powertrain of a hybrid vehicle according to an exemplary embodiment of the present invention.

Referring to FIG. 2, a speed diagram may be analyzed with force and moment equilibrium of equations as follows.

$$(1+R_1+R_2+R_1 \cdot R_2) \cdot T_{MG1} + R_1 \cdot (1+R_2) \cdot T_{ENG} = R_1 \cdot R_2 \cdot T_{OUT} \quad \text{<Equation 1>}$$

$$(1+R_2) \cdot T_{ENG} + (1+R_1+R_2+R_1 \cdot R_2) \cdot T_{MG2} = (1+R_1+R_2) \cdot T_{OUT} \quad \text{<Equation 2>}$$

In this case, $R_1$ denotes a gear ratio of the first sun gear S1 and the first ring gear RG1 ($R_1/S_1$), $R_2$ denotes a gear ratio of the second sun gear S2 and the second ring gear RG2 ($R_2/S_2$), $T_{OUT}$ denotes an output torque (demand torque) of the powertrain, $T_{MG1}$ denotes an output torque of the first motor/generator MG1, and $T_{MG2}$ denotes an output torque (target or demand torque) of the second motor/generator MG2.

The control portion 170 may determine the output torque (e.g., demand torque) of the powertrain $T_{OUT}$ based on driving conditions such as a current shift mode, corresponding signals from the accelerator pedal position sensor 110, corresponding signals from the brake pedal position sensor 120, corresponding signals from the vehicle speed detector 140, corresponding signals from the engine speed detector 150, corresponding signals from the motor/generator condition detector 160, and so on.

The target torque of the second motor/generator $T_{MG2}$ may be calculated from Equation 1 and Equation 2 as follows.

$$T_{MG2} = 1/(1+R_2) \cdot T_{OUT} + 1/R_1 \cdot T_{MG1} \qquad \text{<Equation 3>}$$

While operating in a compound split mode (EVT2 mode) driving, when the driving point of the engine increases, the MG1 executes speed control for following the engine driving point. However, efficiency of following the engine driving point and the demand torque output may vary according to a control method of the MG2.

Conventionally, the control method of MG2 is used for compensating for engine torque. When a current speed of the engine does not follow a target driving point, the MG1 outputs maximum output for following the target driving point.

Simultaneously, the MG2 maintains maximum output for satisfying demand torque due to dissatisfaction of engine speed following. In this case, since compensation of the torque of the MG2 increases, the efficiency of following the engine driving point may be further deteriorated and SOC balancing may also be deteriorated.

Figure 6:
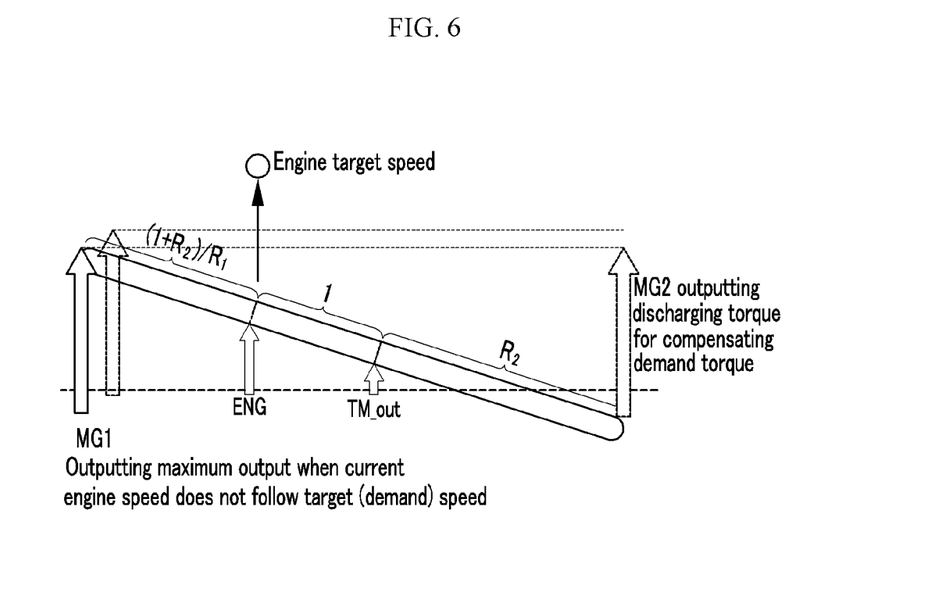
FIG. 6 is a conventional lever diagram of a powertrain of a hybrid vehicle.

That is, as shown in FIG. 6, in a conventional art, the MG1 outputs maximum output for following the target driving point (e.g., a target speed of the engine), and simultaneously, the MG2 outputs discharging torque for compensating for the demand torque.

In the control method for a powertrain of a hybrid vehicle in a compound split mode according to the exemplary embodiment of the present invention, when the current engine speed does not follow the target (demand) speed, the MG2 is provided with a compensation torque, of which direction is opposite to the direction of the MG1, for enhancing the efficiency for following the engine driving point.

In this case, the compensating term a as the compensation torque of the MG2, which is related to the engine target speed (e.g., the engine demand torque) and the current speed of the engine, may be added to the calculated value from Equation 3.

Figure 4:
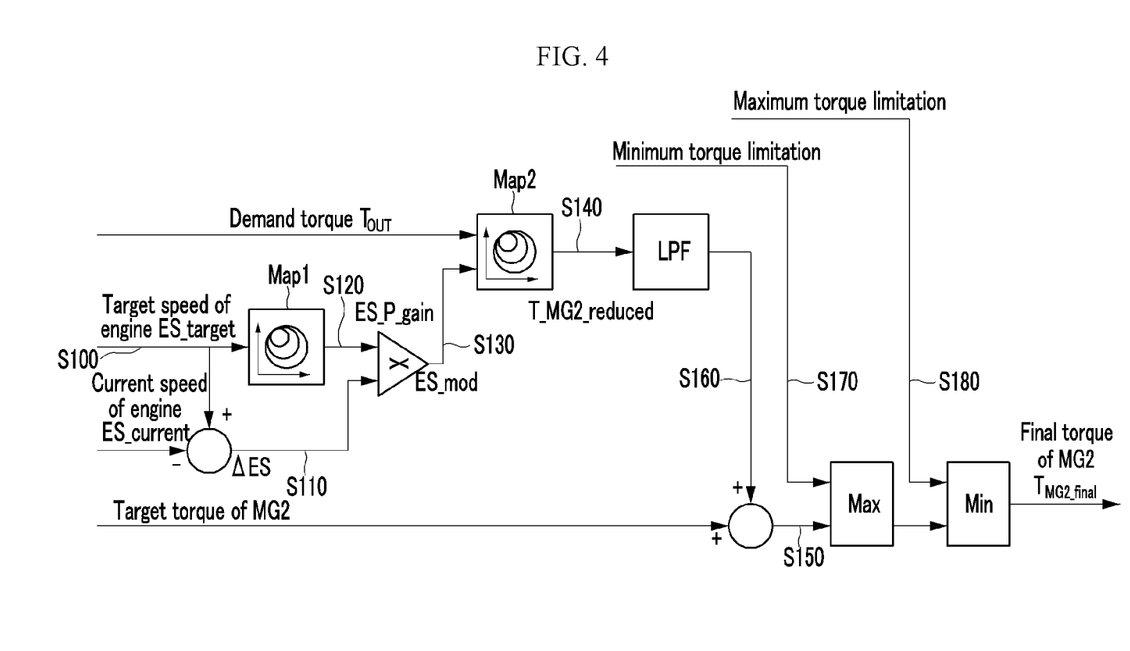
FIG. 4 is a drawing illustrating a determining method of MG2 final torque in a compound split mode according to an exemplary embodiment of the present invention.

FIG. 4 is a drawing illustrating determining method of MG2 final torque in compound split mode according to an exemplary embodiment of the present invention.

The control portion 170 determines a target speed of the engine ES_target considering the current speed of the engine ES_current, vehicle speed VS, a driving mode, a driver's intention based on, e.g., the accelerator pedal position sensor 110, corresponding signals of the brake pedal position sensor 120, and so on (S100).

Also, the control portion 170 may calculate a difference ΔES between the current speed of the engine ES_current and the target speed of the engine ES_target, i.e., it may calculate an error (S110).

The control portion 170 may determine a proportional gain ES_P_gain using the target speed of the engine ES_target through a first map Map1 which may be formed by experiments (S120), and then the control portion 170 determines a modified value ES_mod which is a value that is modified by the difference ΔES and the proportional gain ES_P_gain (S130). In this case, the modified value ES_mod may be an experimental value of which the error is reduced or increased to be an optimal value for controlling.

Then, the control portion 170 determines a reduced torque of the MG2 T_MG2_reduced using a second map Map2, the output torque (demand torque) of the powertrain $T_{OUT}$, and the modified value ES_mod (S140).

The second map Map2 may be compiled through experiments for improving the efficiency of following the engine driving point when the current engine speed does not follow the target (demand) speed in the compound split mode (EVT2 mode).

The reduced torque of the MG2 T_MG2_reduced may be the compensation value α. The final torque of the second motor/generator $T_{MG2\_final}$ may be a sum of the compensation value α and the target torque of the second motor/generator $T_{MG2}$ (S150). That is, the final torque of the second motor/generator $T_{MG2\_final}$ is the sum of the target torque of the second motor/generator $T_{MG2}$ which is calculated from Equation 3 and the compensation value α.

$$T_{MG2\_final} = 1/(1+R_2) \cdot T_{OUT} + 1/R_1 \cdot T_{MG1} + \alpha \qquad \text{<Equation 4>}$$

In the exemplary embodiment of the present invention, the compensation value α may be the reduced torque T_MG2_reduced which is passed through a low pass filter (LPF) for preventing the compensation value α from fluctuating (S160).

In the exemplary embodiment of the present invention, the final torque of the second motor/generator $T_{MG2\_final}$ may be "0" when the torque direction of the final torque of the second motor/generator $T_{MG2\_final}$ is the same as that of the output torque of the first motor/generator $T_{MG1}$.

Figure 3:
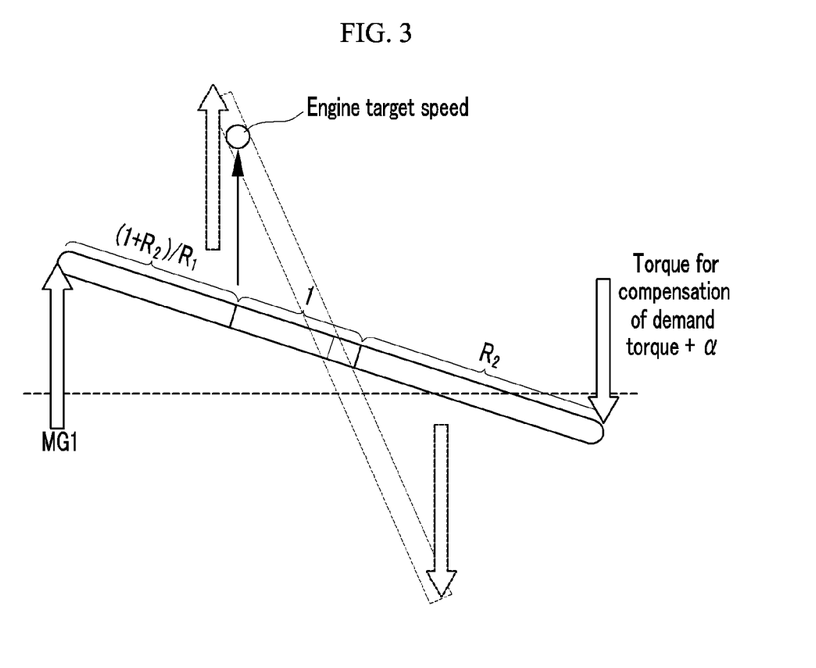
FIG. 3 is a lever diagram of a powertrain of a hybrid vehicle which may be applied to a control method in a compound split mode according to an exemplary embodiment of the present invention.

FIG. 3 is a lever diagram of a powertrain of a hybrid vehicle which may be applied to a control method in a compound split mode according to an exemplary embodiment of the present invention.

Referring to FIG. 3 and FIG. 4, in the exemplary embodiment of the present invention, when the current engine speed does not follow the target (demand) speed in the compound split mode (EVT2 mode), the compensation torque, of which direction is opposite to the direction of the MG1, is applied to the MG2. When the final torque of the second motor/generator $T_{MG2\_final}$ is the same as the direction of the output torque of the first motor/generator $T_{MG1}$, the final torque of the second motor/generator $T_{MG2\_final}$ is to be "0" for the engine speed to follow the target engine speed.

The final torque of the second motor/generator $T_{MG2\_final}$ is determined as a predetermined minimum torque T_min when the final torque of the second motor/generator $T_{MG2\_final}$ is less than the predetermined minimum torque T_min which is determined for stability of the system of the powertrain. The predetermined minimum torque T_min may be predetermined for stability of the system, and may vary according to driving conditions.

The final torque of the second motor/generator $T_{MG2\_final}$ is determined as a predetermined maximum torque T_max when the final torque of the second motor/generator $T_{MG2\_final}$ is higher than the predetermined maximum torque T_max which is determined for stability of the system of the powertrain. The predetermined maximum torque T_max may be predetermined for stability of the system, and may vary according to driving conditions. For example, the minimum torque T_min and the maximum torque T_max may be determined based on a battery SOC, torque limits of the motor/generators, mechanical limitations of the shift system, and so on.

Figure 5:
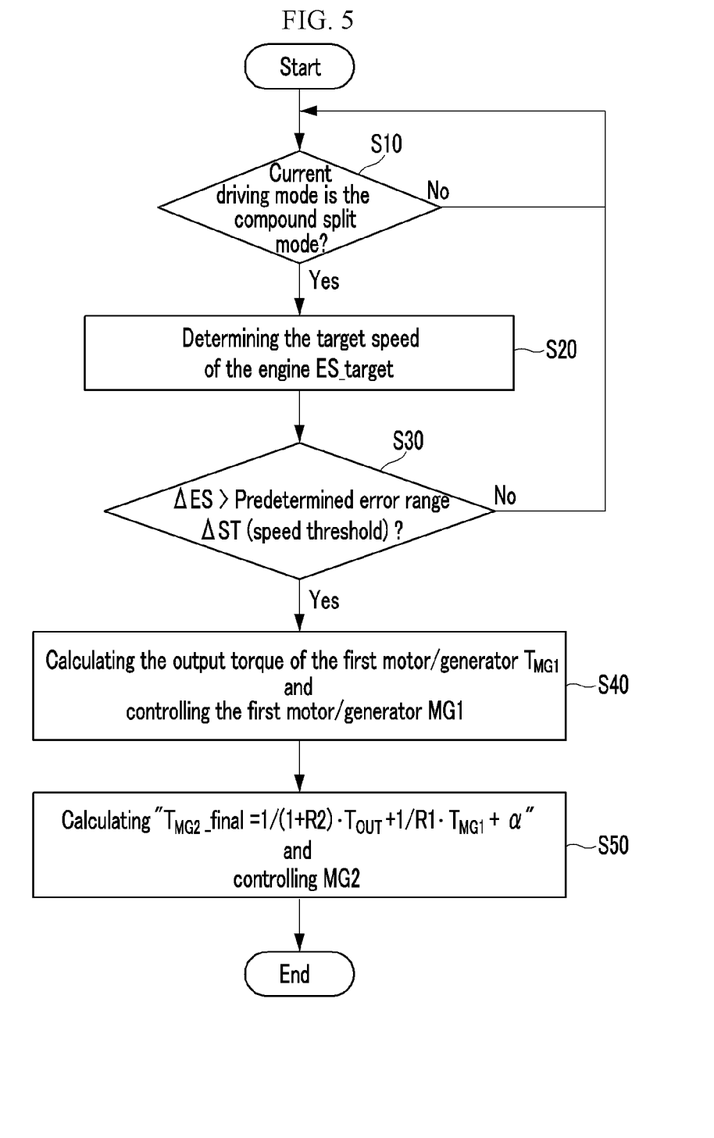
FIG. 5 is a flowchart of a control method for a powertrain of a hybrid vehicle in a compound split mode according to an exemplary embodiment of the present invention.

FIG. 5 is a flowchart of a control method for a powertrain of a hybrid vehicle in a compound split mode according to an exemplary embodiment of the present invention.

Referring to FIG. 5, the control method for a powertrain of a hybrid vehicle in the compound split mode according to an exemplary embodiment of the present invention includes determining, by the control portion 170 whether a current driving mode is the compound split mode at the step S10, determining the target speed of the engine ES_target at the step S20, determining, by the control portion 170 whether the deference ΔES of the target speed of the engine ES_target and the current engine speed ES_current is within a predetermined error range ΔST (speed threshold) at the step S30, calculating, by the control portion 170 the output torque of the first motor/generator $T_{MG1}$ and controlling, by the control portion 170 the first motor/generator MG1 according to the calculated output torque of the first motor/generator $T_{MG1}$ at the step S40, and calculating, by the control portion 170, the final torque of the second motor/generator $T_{MG2\_final}$ based on the target torque of the second motor/generator $T_{MG2}$ which is calculated based on the gear ratio of the first sun gear S1 and the first ring gear RG1, the gear ratio of the second sun gear S2 and the second ring gear RG2, the demand torque of the powertrain Tout and the output torque of the first motor/generator $T_{MG1}$, and the compensation value α which is determined based on the target speed of the engine ES_target, the current speed of the engine ES_current, and the demand torque $T_{OUT}$ based on a driving condition, and controlling the second motor/generator MG2 according to the calculated final torque of the second motor/generator $T_{MG2\_final}$ at the step S50.

The target speed of the engine ES_target may be determined based on the current speed of the engine ES_current, the speed of a vehicle VS, a driving mode, a driver's intention such as the corresponding signals from the accelerator pedal position sensor 110 and the corresponding signals from the brake pedal position sensor 120, and a map in which the considered elements are stored.

In the step S30, when the difference ΔES between the target speed of the engine ES_target and the current speed of the engine ES_current is not within a predetermined MG2 control standard range ΔST (speed threshold), the MG2 control is realized considering the compensation value α. That is, when the current speed does not follow the target driving point, the compensation value α is added to control the MG2. The compensation value α is described above and in FIG. 4, and thus repeated description will be omitted.

In this case, the output torque of the first motor/generator $T_{MG1}$ may be determined based on the difference ΔES between the target speed of the engine ES_target and the current speed of the engine ES_current, and may be calculated considering a proportional gain, a storage gain, and an anti-windup control term as follows.

$$TMG1 = \Delta ES \cdot P\ Gain + \int(\Delta Engine\ Speed \cdot (I\ Gain - Anti\text{-}windup\ Control\ Term)) \quad <Equation\ 5>$$

The control method for a powertrain of a hybrid vehicle in a compound split mode according to the exemplary embodiment of the present invention may control the second motor/generator with the compensation value for the engine to be operated at an optimal condition when the current speed of the engine does not follow the target driving point.

Furthermore, the control logic (of the control portion) of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

While this invention has been described in connection with what is presently considered to be practical exemplary embodiments, it is to be understood that the invention is not limited to the disclosed embodiments. On the contrary, it is intended to cover various modifications and equivalent arrangements included within the spirit and scope of the appended claims.

What is claimed is:

1. A powertrain of a hybrid vehicle comprising:
   a first planetary gear set including a first sun gear, a first carrier, and a first ring gear;
   a second planetary gear set including a second sun gear connected with the first sun gear, a second carrier, and a second ring gear;
   an engine connected to the first carrier;
   a first motor/generator connected to the first ring gear; and
   a second motor/generator connected to the second sun gear,
   wherein a controller is configured to execute a split mode where the first carrier and the second ring gear are connected the controller configured to:
   determine a target torque of the second motor/generator based on a gear ratio of the first sun gear and the first ring gear, a gear ratio of the second sun gear and the second ring gear, a demand torque of the powertrain, and an output torque of the first motor/generator;
   determine a compensation value based on a target speed of the engine and a current speed of the engine; and
   determine a final torque of the second motor/generator based on the target torque of the second motor/generator and the compensation value, and controlling the second motor/generator according to the final torque of the second motor/generator.

2. The powertrain of the hybrid vehicle of claim 1, wherein the target torque of the second motor/generator is determined by a relationship of:

$$T_{MG2} = 1/(1+R_2) \cdot T_{OUT} + 1/R_1 \cdot T_{MG1}$$

wherein $R_1$ is the gear ratio of the first sun gear and the first ring gear;
$R_2$ is the gear ratio of the second sun gear and the second ring gear;
$T_{OUT}$ is the demand torque of the powertrain; and
$T_{MG1}$ is the output torque of the first motor/generator.

3. The powertrain of the hybrid vehicle of claim 2, wherein the compensation value is a reduced torque of the second motor/generator,
   wherein the reduced torque of the second motor/generator is determined according to a target speed of the engine, a difference between the target speed of the engine and the current speed of the engine, and the demand torque based on a driving condition.

4. The powertrain of the hybrid vehicle of claim 3, wherein the final torque of the second motor/generator is a sum of the compensation value and the target torque of the second motor/generator.

5. The powertrain of the hybrid vehicle of claim 4, wherein the final torque of the second motor/generator is zero when a torque direction of the final torque of the second motor/generator is the same as that of the output torque of the first motor/generator.

6. The powertrain of the hybrid vehicle of claim 4, wherein the final torque of the second motor/generator is determined as a predetermined minimum torque when the final torque of the second motor/generator is less than the predetermined minimum torque which is determined for stability of the system of the powertrain.

7. The powertrain of the hybrid vehicle of claim 4, wherein the final torque of the second motor/generator is determined as a predetermined maximum torque when the final torque of the second motor/generator is higher than the predetermined maximum torque which is determined for stability of the system of the powertrain.

8. The powertrain of the hybrid vehicle of claim 3, wherein the compensation value is the reduced torque which has passed through a low pass filter for preventing the compensation value from fluctuating.

9. A control method for a powertrain of a hybrid vehicle in a compound split mode, comprising:
   determining, a controller, whether a current driving mode is a compound split mode;
   determining, by the controller, a target speed of an engine;
   determining, by the controller, whether a difference of target speed of the engine and a current engine speed is within a predetermined error range;
   calculating, by the controller, an output torque of a first motor/generator and controlling the first motor/generator according to the calculated output torque of the first motor/generator; and
   calculating, by the controller, a final torque of a second motor/generator based on a target torque of the second motor/generator, which is calculated based on a gear ratio of a first sun gear and a first ring gear, a gear ratio of a second sun gear and a second ring gear, a demand torque of the powertrain and the output torque of the first motor/generator, and a compensation value which is determined based on a target speed of the engine, a current speed of the engine, and the demand torque based on driving conditions, and controlling the second motor/generator according to the calculated final torque of the second motor/generator.

10. The control method of claim 9, wherein the target torque of the second motor/generator is determined by a relationship of $$T_{MG2}=1/(1+R_2)\cdot T_{OUT}+1/R_1 \cdot T_{MG1}$$

wherein $R_1$ is the gear ratio of the first sun gear and the first ring gear,
$R_2$ is the gear ratio of the second sun gear and the second ring gear,
$T_{ouT}$ is the demand torque of the powertrain, and
$T_{MG1}$ is the output torque of the first motor/generator.

11. The control method of claim 10, wherein the compensation value is a reduced torque of the second motor/generator, and
   wherein the reduced torque of the second motor/generator is determined according to the target speed of the engine, a difference between the target speed of the engine and the current speed of the engine, and the demand torque based on a driving condition.

12. The control method of claim 11, wherein the final torque of the second motor/generator is a sum of the compensation value and the target torque of the second motor/generator.

13. The control method of claim 12, wherein the compensation value is the reduced torque which has passed through a low pass filter for preventing the compensation value from fluctuating.

14. The control method of claim 12, wherein the final torque of the second motor/generator is zero when a torque direction of the final torque of the second motor/generator is the same as that of the output torque of the first motor/generator.

15. The control method of claim 12, wherein the final torque of the second motor/generator is determined as a predetermined minimum torque when the final torque of the second motor/generator is less than the predetermined minimum torque which is determined for stability of the system of the powertrain.

16. The control method of claim 12, wherein the final torque of the second motor/generator is determined as a predetermined maximum torque when the final torque of the second motor/generator is higher than the predetermined maximum torque which is determined for stability of the system of the powertrain.

17. A non-transitory computer readable medium containing program instructions executed by a processor or controller, the computer readable medium comprising:
   program instructions that determine whether a current driving mode is a compound split mode;
   program instructions that determine a target speed of an engine;
   program instructions that determine whether a difference of target speed of the engine and a current engine speed is within a predetermined error range;
   program instructions that calculate an output torque of a first motor/generator and control the first motor/generator according to the calculated output torque of the first motor/generator; and
   program instructions that calculate final torque of a second motor/generator based on a target torque of the second motor/generator, which is calculated based on a gear ratio of a first sun gear and a first ring gear, a gear ratio of a second sun gear and a second ring gear, a demand torque of the powertrain and the output torque of the first motor/generator, and a compensation value which is determined based on a target speed of the engine, a current speed of the engine, and the demand torque based on driving conditions, and control the second motor/generator according to the calculated final torque of the second motor/generator.

* * * * *